3,354,001
METHOD FOR INCREASING THE POROSITY OF A PREDOMINATELY NICKEL-CONTAINING POROUS ELECTRODE
John J. Kelley, Levittown, N.J., assignor to The Electric Storage Battery Company, a corporation of New Jersey
No Drawing. Filed Mar. 14, 1963, Ser. No. 265,045
4 Claims. (Cl. 136—120)

This invention relates to a method for treating metal plates and in particular, it relates to a method for thermally activating a nickel-containing electrode by subjecting it to an oxidation treatment followed by a low temperature reduction treatment.

It is well known in the battery art, which includes fuel cells, that porous metal plates are useful as electrodes. In general, as the surface area or porosity of the metal plates is increased, the electrochemical activity of the electrodes is increased because of better contact between the electrode and the electrolyte. Of course, the degree of porosity of the electrodes is limited by the requirement that they must have a certain amount of structural strength. Several methods have been employed to increase the porosity of battery electrodes. For instance, additional materials are often admixed with the metal powders which are used to form the electrodes, and after the metal powders are compressed and/or sintered so as to form a metal plate, the additional material is leached or burned out of the metal plate and thereby increasing its porosity or surface area. Even though these procedures for increasing porosity are employed, in some instances metal plates so treated, particularly those containing a substantial proportion of nickel, still do not have sufficient electrochemical activity to be useful as battery electrodes.

It is an object of this invention to provide a method for treating electrodes to improve their electrochemical activity.

Another object of the invention is to provide a method for increasing the porosity or surface area of nickel-containing metal electrodes.

Still another object of the invention is to provide a method for increasing the surface area of nickel plaques which may be used to carry electrochemically active material for battery electrodes.

A further object is to provide a method for treating predominately nickel-containing metal plates to increase their electrochemical activity in order that they can be used as battery electrodes.

Other objects and advantages of this invention will be apparent to those skilled in the art in view of the description which follows.

It has been discovered that the surface area or porosity of a metal plate, particularly those containing substantial amounts of nickel, can be increased by subjecting the metal plate to an oxidation treatment followed by a low temperature thermal reduction. The oxidation may be performed by heating the metal plate in an air or oxygen atmosphere. The temperature at which the oxidation is carried out is not critical, though for a metal plate containing predominately nickel a temperature ranging from about 500° C. to about 800° C. may be used. The duration of the thermal oxidation will vary depending upon the type of material being treated and the temperature used. Generally the duration of the oxidation will range from about ½ hour to about 5 hours though this is not critical to this invention. The important feature of the oxidation treatment is that as much of the metal should be oxidized as is possible without causing undue agglomeration. In the event that the metal plate contains an additional material such as a plastic binder, it may be necessary to bring the metal plate up to the oxidation temperature gradually in order to prevent blistering caused by the additional material.

The subsequent reduction may be carried out in a reducing atmosphere such as hydrogen and generally at a lower temperature than the oxidation. It is essentially that the temperature during the reduction process not be so high as to cause agglomeration of the metal particles constituting the plate, for this results in a decreased surface area rather than the desired increased surface area. If the metal plate is predominately nickel, the reduction temperature may range from about 200° C. to 500° C. with temperatures of about 300° C. being preferred. The duration of the reduction treatment will vary depending upon the amount of oxide to be reduced and the reducing temperature, though generally from about ½ hour to about 5 hours will be sufficient to reduce substantially all of the oxide formed during the oxidation.

As previously stated, the oxidation-reduction treatment in accordance with this invention is particularly useful in treating battery electrodes which are predominately nickel. It was found that nickel plates containing a plastic binder which were heated in a reducing atmosphere to burn out the plastic binder, with no oxidation treatment, had insufficient electrochemical activity to be useful as fuel cell electrodes. But when these same plates were thereafter subjected to an oxidation-reduction treatment in accordance with this invention, it was discovered that their electrochemical activity had substantially increased so that they were now useful as fuel cell electrodes. In an effort to explain this increase in electrochemical activity, it was determined that the surface area of the nickel plates had been greatly increased. Furthermore, it has been found that the surface area can be increased by repeating the oxidation-reduction treatment, i.e., having a plurality of oxidation-reduction treatments.

A nickel plate which is treated in accordance with this invention may comprise the active material of the electrode, that is it may be used as a nickel electrode. In addition, the nickel plate may also comprise the matrix of an electrode and as such act as a carrier for some other type of active material such as cadmium, palladium, platinum, silver, etc. It is evident that the increased surface area of the nickel plate will be beneficial whether the nickel plate is used as the active material or as a carrier.

The time during the manufacture of the nickel plate at which it receives the oxidation-reduction treatment is not critical. Generally, it should have substantial structural stability so that it can be readily handled prior to treating it in accordance with this invention. If the plate is to be used as a carrier for another type of active material, it may be treated prior to or after the active material is deposited upon the plate, though generally it is preferred that the plate be treated prior to the deposition in order to have a greater surface area upon which active material may be deposited.

In carrying out the oxidation-reduction treatment of this invention, it is not essential that the reduction process immediately follow the oxidation, though this is generally preferred. It is permissible to oxidize the plate, store it in the oxidized state, and reduce it at a later date. The essential factor of the invention is that there be an oxidation process followed by a relatively low temperature reduction process whereby a substantial amount of the oxide is reduced without undue agglomeration.

The following examples are illustrative of the procedures and advantages of this invention:

Example I

Two hydrogen electrodes for use in a fuel cell were prepared from the following composition:

| Component: | Parts by wt. |
|---|---|
| Polyethylene | 65 |
| Ethylene oxide polymer | 60 |
| Nickel | 1100 |
| Palladium oxide | 20 |
| Silver oxide | 23 |

One electrode (A) was prepared by sintering it at 600° C. in hydrogen for 1 hour. Electrode A had a surface area of 0.23 m.²/g. Another electrode (B) was treated in accordance with this invention. Electrode B was oxidized in air at 600° C. for 1 hour and thereafter was reduced in hydrogen at 300° C. for 2 hours. Electrode B had a surface area of 2.7 m.²/g. indicating a tenfold increase in surface area.

Electrodes A and B were tested as hydrogen electrodes in an alkaline electrolyte (a 27% solution of KOH) at 40° C. The following tests results were obtained:

| Current Density (ma./cm.²) | Half Cell Potential vs. Hydrogen Electrode | |
|---|---|---|
| | A | B |
| 50 | +0.120 | +0.020 |
| 100 | +0.320 | +0.050 |
| 200 | | +0.130 |

Since a hydrogen electrode having a low potential vs. $H_2$ is desired, it is apparent that electrode B, which was treated in accordance with this invention, is far superior to electrode A.

Example II

Two oxygen electrodes were also prepared as in Example I and from the same composition as used in Example I except for the palladium oxide which was omitted. One electrode (A) was prepared by sintering it at 675° C. in hydrogen for 1 hour. The other electrode (B) was prepared in accordance with this invention and was oxidized in air at 600° C. for 1 hour, followed by a reduction in hydrogen at 300° C. for 2 hours.

Electrodes A and B were tested as oxygen electrodes in an alkaline electrolyte (27% KOH) at 40° C. The following results were obtained:

| Current Density (ma./cm.²) | Half Cell Potential vs. Hydrogen | |
|---|---|---|
| | A | B |
| 50 | +0.90 | +0.93 |
| 100 | +0.82 | +0.88 |
| 200 | +0.66 | +0.82 |

Since it is preferred that the oxygen electrode have a high potential vs. $H_2$, electrode B prepared in accordance with this invention gave better performance particularly at the high current density.

Example III

Two silver electrodes, each having a nickel matrix, were prepared using an oxidation-reduction procedure. In this example, the silver active material was mixed into the nickel powder matrix before the oxidation-reduction treatment. Both electrodes were oxidized in air at 600° C. for 1 hour. One electrode was reduced in hydrogen at 600° C. whereas the other electrode was reduced at 300° C. The electrode reduced at 600° C. had a porosity of 0.1475 cc./g., whereas the one reduced at 300° C. had a porosity of 0.2375 cc./g. This demonstrates the importance of carrying out the reduction procedure at relatively low temperatures.

Having completely described this invention, what is claimed is:

1. A method for increasing the porosity of a predominately nickel-containing, porous electrode which comprises oxidizing said electrode by heating it in an atmosphere containing oxygen to a temperature ranging from about 500° C. to about 800° C. in a manner which does not cause excessive agglomeration of the nickel particles, and thereafter reducing said electrode by heating it in a reducing atmosphere to a temperature ranging from about 200° C. to about 500° C., with said temperatures being selected so that the reducing temperature is substantially less than the oxidizing temperature.

2. A method in accordance with claim 1 in which the temperature during reduction is about 300° C.

3. A method in accordance with claim 1 in which the reduction treatment has a duration ranging from about ½ to about 5 hours.

4. A method in accordance with claim 1 in which the oxidation and the reduction treatment is repeated so as to subject the electrode to a plurality of oxidation-reduction treatments.

References Cited

UNITED STATES PATENTS

| | | | |
|---|---|---|---|
| 1,851,573 | 3/1932 | Elsey | 148—6.3 |
| 2,197,622 | 4/1940 | Sendzimir | 117—51 |
| 2,417,460 | 3/1947 | Eitel et al. | 148—6.3 |
| 3,167,457 | 1/1965 | Bacon | 136—120 |
| 3,181,973 | 5/1965 | Duddy | 136—120 |
| 3,188,240 | 6/1965 | Lee et al. | 136—237 |
| 3,212,930 | 10/1965 | Thompson | 136—120 |

ALLEN B. CURTIS, *Primary Examiner.*

WINSTON A. DOUGLAS, *Examiner.*

H. FEELEY, *Assistant Examiner.*